Oct. 30, 1951 M. MAY 2,573,041
ANTICIPATING CONTROL
Filed Oct. 15, 1947
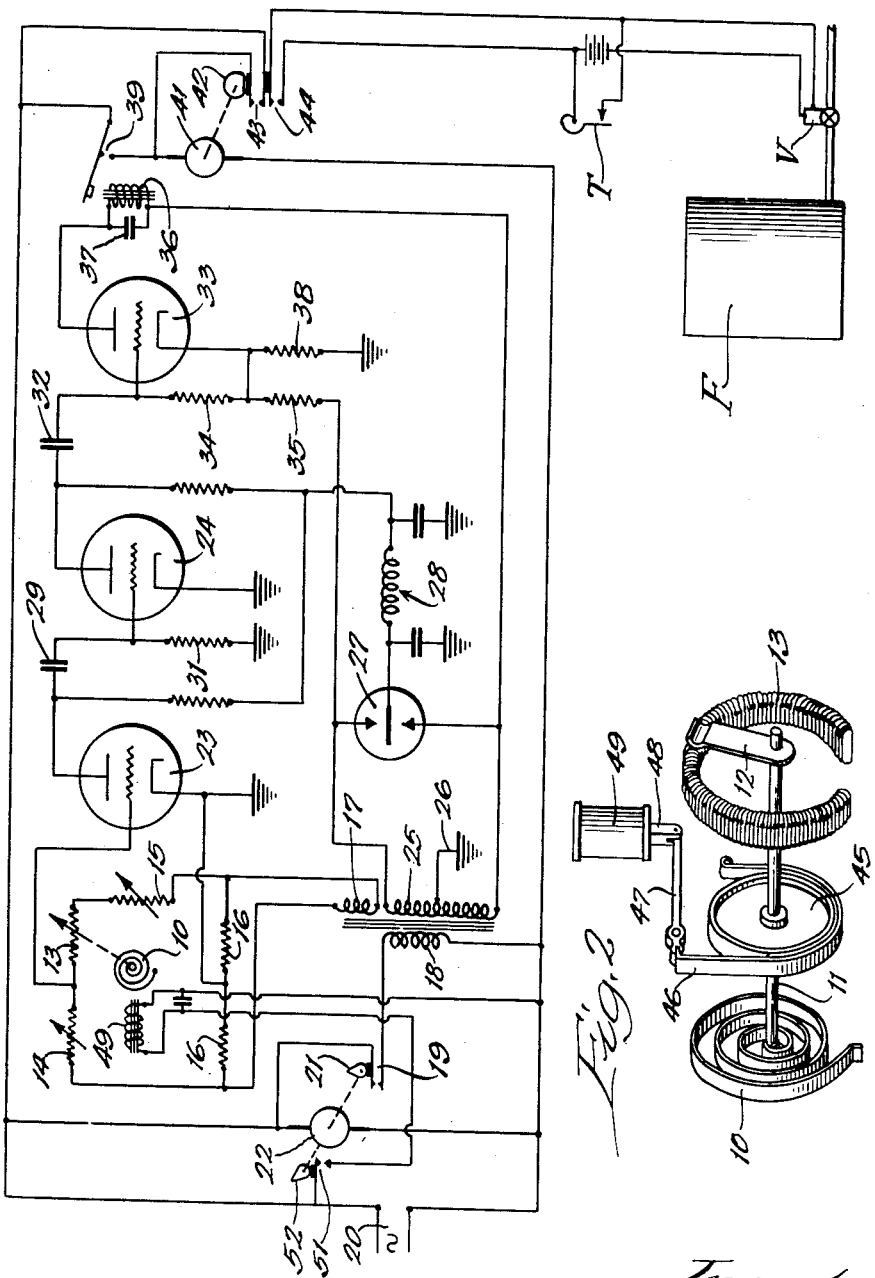
Inventor:
Madeline May,
By Dawson, Booth and Spangenberg,
Attorneys.

Patented Oct. 30, 1951

2,573,041

UNITED STATES PATENT OFFICE 2,573,041

ANTICIPATING CONTROL

Madeline May, Chicago, Ill., assignor to
James Watson, Appleton, Wis.

Application October 15, 1947, Serial No. 779,869

8 Claims. (Cl. 236—46)

This invention relates to an anticipating control and more particularly to a control for space heating systems to anticipate an increased demand for heat.

One of the objects of the invention is to provide an anticipating control in which the outside temperature is periodically sensed and a predetermined correction is applied if the temperature has dropped a predetermined amount.

Another object is to provide an anticipating control in which a correction is applied if the temperature has dropped but not if the temperature has increased.

Still another object is to provide an anticipating control in which departure of the temperature from the desired value initiates operation of a motor means which operates through a predetermined cycle to apply a predetermined correction. Preferably the motor means operates a holding circuit to insure that it will operate throughout the desired cycle.

A further object is to provide a relatively simple electric circuit to insure operation of the system when the temperature departs from the desired value in one direction but not when it departs from the desired value in the opposite direction.

The above and other objects and advantages of the invention will be more readily apparent when read in connection with the accompanying drawing, in which—

Figure 1 is a diagrammatic view of a control system embodying the invention; and Figure 2 is a partial perspective view of a portion of the system.

The system, as shown in Figure 1, is adapted to control the temperature in a space heated by a furnace F. The furnace is supplied with fuel under the control of an electrically operated valve V which is controlled by a room thermostat T.

The anticipating control includes a sensing element 10 which is responsive to the outside temperature and which may be a bi-metal coil mounted outdoors. The outer end of the coil may be anchored and the inner end conected to a shaft 11 which carries a wiper 12 movable over a resistor 13. As the shaft turns in response to changes in temperature, the value of the resistor 13 will be varied in accordance with changes in the temperature.

The resistor 13 forms a portion of a bridge circuit including a resistor 14 mounted outdoors and whose value varies in response to temperature, an adjustable resistor 15 in series with the resistor 13, and a pair of fixed resistors 16. The resistor 15 may be adjusted to set the balance point of the system and to adjust its sensitivity. The bridge is supplied with alternating current from a transformer secondary winding 17 which is connected to the corners of the bridge between resistors 15 and 16 and 14 and 16, as shown. The transformer includes a primary winding 18 which is connected through a switch 19 to a source of alternating current 20 such as the usual sixty cycle supply line. The switch 19 is normally open and is adapted to be closed periodically to complete the circuit to the transformer primary by means of a cam 21 driven by a motor 22 which is connected directly across the supply source 20. The motor speed and cam design may be so selected that the switch 19 will be closed at any desired interval and will remain closed for any desired period of time. By way of example, it may be assumed that the switch 19 is closed for a period of three minutes out of every half hourly period.

Unbalance of the bridge circuit controls an electrical circuit including a pair of similar vacuum tubes 23 and 24 which may, if desired, be in a common envelope. The opposite corners of the bridge circuit are connected between the cathode and grid of the tube 23 as shown so that when the bridge circuit is unbalanced the tube 23 will conduct. Plate supply voltage for the tubes 23 and 24 is provided by a secondary winding 25 on the transformer whose midpoint is grounded at 26 and whose opposite ends are connected through a full wave rectifier 27 and a filter circuit indicated generally at 28 to the electrodes of the tubes. The plate of the tube 23 is coupled through a condenser 29 and a resistor 31 to the grid of the tube 24 which is in turn coupled through a condenser 32 to the grid of a gaseous discharge tube such as a Thyratron tube 33. The grid of the Thyratron tube is connected through resistors 34 and 35 to the upper end of the winding 25 and its plate is connected through a relay 36 and a bypass condenser 37 to the lower end of the winding 25. The cathode of the Thyratron tube is grounded through a resistor 38 and the point between resistors 34 and 35 is connected to the cathode, as shown.

The relay 36 functions when energized to close a switch 39 in circuit with a motor 41 which is connected across the supply source 20. The motor 41 drives a cam 42 which controls a pair of switches 43 and 44. As shown, the cam is circular throughout the major portion of its circumference and is formed with a single low spot so that the switches 43 and 44 will be closed during initial operation of the motor, and will open when the cam reaches the position shown. The length of the cycle may be controlled by the cam design and the motor speed so that the switches will be maintained closed for any desired period each time operation of the motor is initiated. The switch 43 is connected in parallel with the switch 39, as shown, to provide a holding circuit to insure that the motor will operate through its full predetermined cycle each time it is started. The switch 44 functions as a control device for the valve condition and may be connected with the valve V to open it and supply heat to the furnace when the switch is closed.

With the circuit, as shown, it will be noted that the relay 36 will be energized when the bridge is unbalanced in one direction but not when it is unbalanced in the opposite direction. Since the tube 33 is supplied with alternating current, it can conduct only when its plate is positive relative to its cathode or in other words during the portion of the alternating cycle when the lower part of the winding 25 is positive. Even during this time unles the tubes 23 and 24 are conducting, the tube 33 will not fire since its grid is biased negative beyond cut off through its connection to the upper part of the winding 25. Thus when the bridge circuit is in balance the tube 33 will not fire and the relay 36 will not be energized so that no heat will be supplied.

If the bridge becomes unbalanced a predetermined amount due to a decrease in temperature, the tubes 23 and 24 will conduct to supply a positive biasing voltage to the grid of the tube 33 whose phase is so related to that of the voltage in the winding 25 that the grid of the tube 33 will be driven positive at a time when the plate is positive. Under these conditions the tube 33 will fire to energize the relay 36 and close the switch 39. This will cause the motor 41 to start running so that switches 43 and 44 will be closed to supply heat. Closing of switch 43 will maintain the motor 41 in circuit regardless of opening of the switch 39 so that it will operate through a complete revolution of the cam to supply a predetermined amount of heat during each cycle.

If the temperature has increased above the desired value when the switch 19 closes, the bridge will be unbalanced in the opposite direction so that the phase of the pulsating current supplied to the grid of the tube 33 by the tubes 23 and 24 will be reversed. This current will, therefore, drive the grid of the tube 33 positive at a time when its plate is negative so that the tube cannot fire. Thus heat will be supplied when the outside temperature has decreased a predetermined amount but not if it has remained constant or increased.

According to the invention, the resistors 13 and 14 are adapted to sense the rate of change of outside temperature. For this purpose the shaft 11 carries a brake cylinder 45 which is adapted to be engaged by a brake band 46 to hold the shaft against rotation. One end of the band 46 may be fixedly anchored and the other end may be connected to one end of a lever 47 whose opposite end carries a core 48 movable into a solenoid coil 49. When the coil 49 is energized, the core 48 will be raised to loosen the band 46 so that the shaft 11 is free to turn. The coil 49 is connected across the source 20 through a switch 51 which is controlled by a cam 52 driven by the rotor 22. The cam 52 is displaced relative to the cam 21 so that the switch 51 will be closed after the switch 19 is open and will be held open for a desired period of time determined by design of the cam. During the remainder of the cycle the brake 46 will be engaged to hold the shaft 11 against movement so that the resistor 13 cannot be adjusted.

In operation of the system, when the outside temperature remains constant or changes at a very slow rate, the furnace will be controlled in the usual manner by the room thermostat T. The variable resistor 14 will change its value in response to changes in outside temperature and may be such as to produce a variation of from about 200 to 1000 ohms upon a temperature change of from plus 30° C. to minus 30° C. The value of this resistor is responsive to the instantaneous outside temperature at all times. The shaft 11 is normally held fixed by the brake 46 and is released for a brief period once during each cycle by closing of the switch 51. By way of example, the brake may be released for a period of three minutes during each half hour so that the value of the resistor 13 will be indicative of the temperature at the time the brake 46 was released. Thus the difference between the resistors 13 and 14 and the unbalance of the bridge is indicative of the change of temperature during a half hourly cycle.

Assuming that the temperature has dropped a predetermined amount such as 5° F. during a cycle, the bridge will be unbalanced sufficiently to cause the tubes 23 and 24 to conduct when the switch 19 is closed. Under these conditions the tube 33 will fire to energize the relay 36 and start the motor 41. This will close the switch 44 for a predetermined interval which may be set according to the installation conditions but which may be assumed to be a five minute period. Thus the valve V will be opened to supply a predetermined increment of heat to the furnace. Immediately after the switch 19 is opened the switch 51 will be closed to release the brake so that the resistor 13 will be reset at the existing temperature. If the outside temperature does not drop the required amount during the next cycle, the bridge will not be sufficiently unbalanced to cause the tubes to conduct so that no heat will be supplied to the furnace by the anticipating control. If the outside temperature remains constant or rises during any cycle, the anticipating control will not operate.

In the operation of the system it will be seen that the control anticipates a change in inside temperature which will result from a predetermined change in outside temperature and supplies a predetermined increment of heat to anticipate the change regardless of the existing inside temperature. Thus on a rapid drop in outside temperature the inside temperature will be held more nearly at a constant value and will not be permitted to fall to the same extent as if the effect of the outside temperature change on the inside temperature had not been anticipated.

While one embodiment of the invention has been shown and described in detail herein, it will be understood that this is illustrative only and is not to be taken as a definition of the scope of the invention, reference being had for this purpose to the appended claims.

What is claimed is:

1. An anticipating control for use with a space heating system comprising motor means operable through a predetermined cycle, a control device operated by the motor means and conditioned by the motor means to supply a predetermined increment of heat to the space during each cycle, and means comprising a pair of sensitive elements outside the space for intermittently sampling the outside temperature and generating a control signal responsively to changes in such outside temperature between successive samplings, and means responsive to said control signal to start the motor on a cycle of operation only when the temperature has dropped between successive samplings by a predetermined amount.

2. An anticipating control for use with a space heating system comprising motor means operable through a predetermined cycle, a control device operated by the motor means and conditioned by the motor means to supply a predetermined increment of heat to the space during each cycle, a sensitive element continuously responsive to the temperature outside of the space, a second sensitive element normally held inoperative, means operative at regular intervals to free for a brief period the second element for response to said outside temperature, and means responsive to the difference between the sensitive elements a predetermined time after said response of the second element to control operation of the motor means.

3. An anticipating control for use with a space heating system comprising an electrical bridge circuit including a pair of variable impedance elements, one of which is continuously responsive to the temperature outside of the space, means intermittently operative at regular intervals to adjust the other element in response to the temperature outside of the space, motor means operable through a predetermined cycle, a control device operated by the motor means, and means responsive to unbalance of the circuit to initiate operation of the motor means.

4. An anticipating control for use with a space heating system comprising an electrical bridge circuit including a pair of temperature-sensitive variable impedance elements one of which is continuously responsive to the temperature outside of the space, means for holding the other element normally inoperative, means operative periodically to release said other element for a brief period of operation, motor means operable through a predetermined cycle, a control device operated by the motor means, means periodically to interrupt and complete the circuit, and means responsive to unbalance of the circuit during the time when it is completed to initiate operation of the motor means.

5. An anticipating control for use with a space heating system comprising a normally balanced electric circuit including a pair of variable impedance elements, one of which is continuously responsive to the temperature outside of the space, means responsive to the temperature outside of the space to adjust the other element, a brake to hold the other element fixed, motor means operable through a predetermined cycle, a control device operated by the motor means, means periodically to interrupt and complete the circuit, means periodically to release the brake during the period when the circuit is interrupted, and means responsive to unbalance of the circuit to initiate operation of the motor means.

6. An anticipating control for use with a space heating system comprising a normally balanced electrical circuit including a pair of variable impedance elements one of which is continuously responsive to the temperature outside of the space, means intermittently operative at regular intervals to adjust the other element in response to the temperature outside of the space, motor means operable through a predetermined cycle, a control device operated by the motor means, an electron tube having an input circuit and an output circuit, means to connect the first named circuit to the tube input circuit to control the tube, and control means connected in the tube output circuit to initiate operation of the motor means.

7. An anticipating control for use with a space heating system comprising a normally balanced electrical circuit including a pair of variable impedance elements one of which is continuously responsive to the temperature outside of the space, means intermittently operative at regular intervals to adjust the other element in response to the temperature outside of the space, motor means operable through a predetermined cycle, a control device operated by the motor means, connections from the circuit to a source of alternating current, an electron tube having an input circuit and an output circuit, connections from said source to the tube input and output circuits, means connected in the output circuit to initiate operation of the motor means, and a circuit responsive to unbalance of the first named circuit to supply a controlling voltage to the tube input circuit whose phase depends on the direction of unbalance of the first named circuit.

8. An anticipating control for use with a space heating system comprising a normally balanced electric circuit including a pair of variable impedance elements one of which is continuously responsive to the temperature outside of the space, means responsive to the temperature outside of the space to adjust the other element, a brake to hold the other element fixed, motor means operable through a predetermined cycle, a control device operated by the motor means, means periodically to interrupt and complete the circuit, means periodically to release the brake during the period when the circuit is interrupted, connections from the circuit to a source of alternating current, an electron tube having an input circuit and an output circuit, connections from said source to the tube input and output circuits, means connected in the output circuit to initiate operation of the motor means, and a circuit responsive to unbalance of the first named circuit to supply a controlling voltage to the tube input circuit whose phase depends on the direction of unbalance of the first named circuit.

MADELINE MAY.

REFERENCES CITED

The following references are of record in the file of this patent:

UNITED STATES PATENTS

| Number | Name | Date |
| --- | --- | --- |
| 1,989,829 | Specht | Feb. 5, 1935 |
| 2,043,834 | Marbury | June 9, 1936 |
| 2,144,668 | Stoessel | Jan. 24, 1939 |
| 2,192,144 | Miller | Feb. 27, 1940 |
| 2,202,731 | Crago | May 28, 1940 |
| 2,271,651 | Kucera | Feb. 3, 1942 |
| 2,291,840 | Spangenberg | Aug. 4, 1942 |
| 2,439,680 | Volz | Apr. 13, 1948 |
| 2,443,347 | Field | June 15, 1948 |